(12) United States Patent
Englander

(10) Patent No.: US 8,075,169 B2
(45) Date of Patent: *Dec. 13, 2011

(54) EXTERNAL SAFETY ILLUMINATION FOR A BUS

(75) Inventor: Benjamin Englander, Mt. Vernon, NY (US)

(73) Assignee: Rosco Inc., Jamaica, NY (US)

( * ) Notice: Subject to any disclaimer, the term of this patent is extended or adjusted under 35 U.S.C. 154(b) by 563 days.

This patent is subject to a terminal disclaimer.

(21) Appl. No.: 11/936,522

(22) Filed: Nov. 7, 2007

(65) Prior Publication Data

US 2008/0106908 A1    May 8, 2008

Related U.S. Application Data

(60) Provisional application No. 60/857,250, filed on Nov. 7, 2006, provisional application No. 60/913,580, filed on Apr. 24, 2007.

(51) Int. Cl.
- *B60Q 1/00* (2006.01)
- *B60Q 3/00* (2006.01)
- *B60Q 11/00* (2006.01)

(52) U.S. Cl. .......................................... 362/478; 362/545

(58) Field of Classification Search .................. 362/253, 362/478, 485, 494, 545

See application file for complete search history.

(56) References Cited

U.S. PATENT DOCUMENTS

| | | | | |
|---|---|---|---|---|
| 5,281,948 | A | * | 1/1994 | Estrada .......................... 340/433 |
| 5,455,625 | A | | 10/1995 | Englander |
| 5,467,071 | A | * | 11/1995 | Koenig .......................... 340/433 |
| 5,493,269 | A | | 2/1996 | Durley et al. |
| 5,576,899 | A | | 11/1996 | Englander |
| 5,874,989 | A | * | 2/1999 | O'Brien et al. ................ 348/148 |
| 6,371,618 | B1 | | 4/2002 | Englander |
| 6,796,667 | B1 | | 9/2004 | Englander |
| 6,871,981 | B2 | * | 3/2005 | Alexanderson et al. ....... 362/294 |
| 6,883,923 | B2 | | 4/2005 | Englander |
| 7,055,973 | B2 | | 6/2006 | Englander |
| 2005/0180032 | A1 | | 8/2005 | Seguchi et al. |
| 2005/0195383 | A1 | | 9/2005 | Breed et al. |

FOREIGN PATENT DOCUMENTS

JP    10-059077    3/1998

* cited by examiner

*Primary Examiner* — Jason Moon Han

(74) *Attorney, Agent, or Firm* — Stroock & Stroock & Lavan LLP

(57) ABSTRACT

A lighting strip along the side of a schoolbus or other passenger vehicle between a door near the front of the schoolbus and the back side of the schoolbus to reduce the risk of people or other objects being injured by the schoolbus. The lighting strip may be focused downward to illuminate the ground and may provide vehicle status information and guiding information. Lighting strips may be provided on both sides of the schoolbus, and may also be provided on the back side of the schoolbus and on mirrors or mirror arms. Further, the lighting strips may be provided on the underside of the schoolbus along the passenger side. One or more floodlights may be provided on the roof or near the top of the schoolbus along the side with the door. An expandable crossing gate on the driver's side of the exterior wall is also provided.

25 Claims, 9 Drawing Sheets

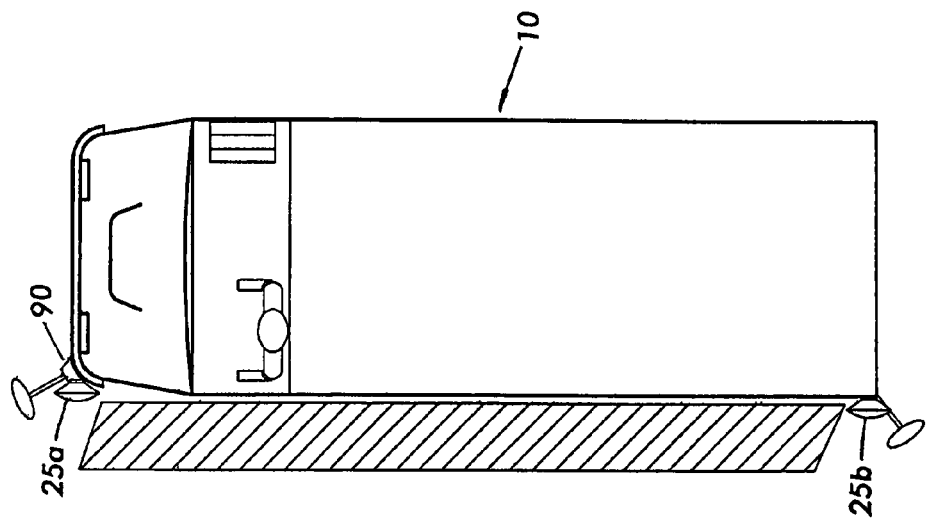
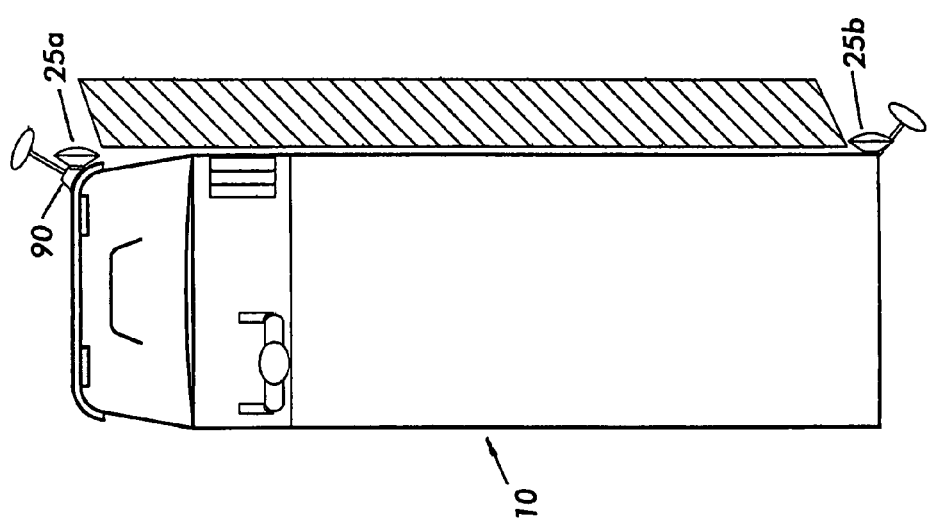

EXTERNAL SAFETY ILLUMINATION FOR A BUS

CROSS REFERENCE TO RELATED APPLICATIONS

The present application claims benefit of and priority to U.S. Provisional Application Ser. No. 60/913,580 filed Apr. 24, 2007 entitled EXTERNAL SAFETY ILLUMINATION FOR A BUS, which is a continuation-in-part of U.S. Provisional Patent Application Ser. No. 60/857,250 filed Nov. 7, 2006 entitled MULTIPLE CAMERA SYSTEM FOR PROVIDING 360 DEGREE COVERAGE FOR SCHOOL BUSES, the entire contents of which applications are hereby incorporated by reference herein.

FIELD OF THE INVENTION

The present application generally relates to vehicle exterior illumination, and more particularly, to an illumination apparatus, system and method for illumination of the exterior of a bus, such as a schoolbus, for the safety of passengers exiting or boarding the bus.

BACKGROUND OF THE INVENTION

Passengers exiting and boarding a larger vehicle, such as a schoolbus present the operator of the vehicle, such as the schoolbus driver, with the problem that the vehicle cannot be safely moved until the passengers have cleared the area around the vehicle. Mirrors mounted at various portions of the interior and exterior of the vehicle are often used to help the vehicle operator in determining when it is safe to recommence movement of the vehicle.

Schoolbuses pose a particular challenge because they carry children and society has set higher standards for protecting these children from themselves and from others, as they board and disembark from schoolbuses. Children are typically shorter than adults and therefore their visibility around and behind the schoolbus is more challenging for the schoolbus driver. Also, children may not be aware of the urgency of the need to clear the area around the schoolbus.

Schoolbuses have government mandated requirements for mirror systems to aid the driver in monitoring the students/children as they embark and disembark from the schoolbuses. A great body of prior art has been developed for such mirror systems, including so-called cross-view or cross-over mirrors, which provide a panoramic view to the driver, showing the children as they move about in front and alongside the schoolbus. Federal regulations that relate to cross-view mirrors are known as the FMVSS111 regulations.

More recently, camera systems have been used in the interiors of schoolbuses. As an example, the present assignee describes an interior camera and a protective closure therefor, in its U.S. Pat. No. 5,455,625.

However, poor visibility conditions, such as when it is dark or near dark outside or during misty or foggy conditions, present a problem for the schoolbus driver, even with the best mirror system and with the optimal camera system. Therefore, the need to provide for good visibility and illumination of the area around, behind and/or under the schoolbus remains.

SUMMARY OF THE DISCLOSURE

Examples of the invention will be provided with respect to a schoolbus. However, it will be understood that the illumination system provided has application for other types of buses and vehicles, particularly larger vehicles with passengers.

According to an aspect of the present disclosure, strip lighting is provided along a side, or along both sides of the schoolbus to illuminate an area near the schoolbus. For example, an LED (light emitting diode) lighting system that emits white light may be provided, as a lighting strip along the side of the schoolbus between a door near the front of the schoolbus and the back side of the schoolbus, and to the front as well. The lighting strip may be slightly tilted down or otherwise aimed or focused down to illuminate the ground near the schoolbus. Lighting strips may be provided on both sides of the schoolbus, and may also be provided on the back side of the schoolbus. Further, the lighting strip may be provided on the bottom, i.e., underside, of the schoolbus along the side to illuminate the bottom of the schoolbus and the area along the side of the schoolbus. Such a configuration is particularly suitable for a schoolbus for which the risk of a small child falling under the schoolbus is a hazard to be avoided. Moreover, less light will be reflected into the driver's eyes, causing less interference with the driver's night or low light vision.

According to another aspect of the instant disclosure, one or more down pointing floodlights may be provided on the roof or near the top of the schoolbus along the side with the passenger door to illuminate the area near the schoolbus. Alternatingly, a single strobe light may sweep the area or may be controlled by the schoolbus operator to be directed to a particular area.

A control mode in which the illuminating lights are triggered by an opening of the schoolbus door or by the flashing light provided on the exterior rear of the schoolbus is also provided. A timer may then be used to turn off the light after a set or adjustable period of time following the closing of the door or contemporaneous with the cessation of the flashing light.

The lights may be configured to display letters advising that the vehicle is approaching or departing, or that it is safe or unsafe for passengers to enter the area or lane adjacent the vehicle.

An expandable crossing gate on the driver's side of the exterior wall is also provided.

Other features and advantages of the present disclosure will become apparent from the following description of the disclosure that refers to the accompanying drawings.

BRIEF DESCRIPTION OF THE DRAWINGS

FIGS. 9A and 9B are top views illustrating lighting fixtures mounted on mirror mounts or mirror arm extending from the passenger side and the driver's side of the bus, according to an aspect of the present disclosure.

With reference to the drawings, the features thereof are described below.

DETAILED DESCRIPTION OF EMBODIMENTS OF THE INVENTION

FIGS. 1-4 show a schoolbus 10 with illuminated areas 30 provided by lighting strips 20 mounted on both sides of the schoolbus 10, according to an embodiment of the present invention. Such an illumination may be quite helpful to a vehicle operator, such as the schoolbus driver in preventing accidents involving passengers boarding or exiting from the vehicle. For example, during times of poor visibility when it is dark outside, such as at night, twilight, late winter afternoons, etc., children who are waiting to board the schoolbus 10 may linger or fall near the schoolbus 10 and accidentally end up near or underneath the schoolbus 10, as it starts moving. The illumination shown in FIG. 1 aids the schoolbus driver in spotting children or fallen objects underneath or near the schoolbus 10.

Figure 3:
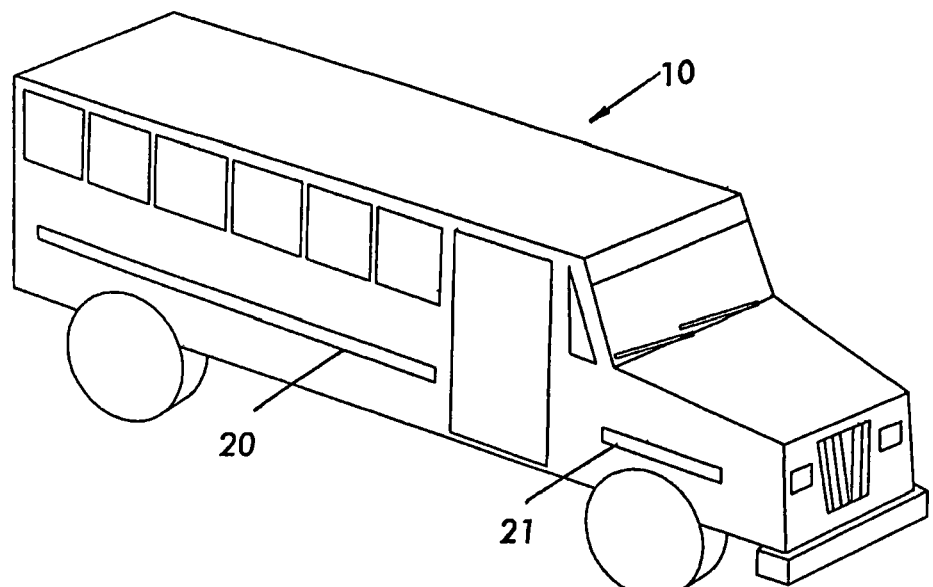
FIG. 3 is a perspective view of a schoolbus showing lighting strips mounted on a side of the schoolbus, according to an embodiment of the present invention.

FIG. 3 shows lighting strip 20 mounted on the side 11 of the schoolbus 10. FIG. 3 also shows an additional lighting strip 21 provided on the same side 11 of the schoolbus 10 closer to the front of the schoolbus 10. The lighting strip 20 and the additional lighting strip 21 may be provided as a series of LEDs to reduce cost and to eliminate having to frequently change light sources or power sources for the lighting strips. Also, LEDs provide a low light that does not interfere with the operation of the schoolbus 10 or the visibility through the mirrors (not shown) by which the schoolbus operator views the illuminated area. The LEDs may preferably provide a white light, however other colors may also be used.

The lighting strip 20 may be oriented slightly downward to focus the light to where it is most needed and to reduce interference with the schoolbus operator's visibility through the mirrors 8 or cameras 9 mounted on the exterior front fenders of the schoolbus 10. Thus, the entire lighting strip 20 may be mounted at a slightly angled manner to focus light downward, or the individual light sources within the lighting strip 20 may be arranged to focus light downward by means of their orientation or through the use of blinders or other light orienting apparatuses well known in the prior art. Although shown as a single lighting strip 20, the lighting strip 20 may be provided as a series of unconnected strips along the side 11 of the schoolbus 10 so long as sufficient illumination is provided to the illumination areas 30. Also, an additional lighting strip (not shown in FIGS. 3 and 4) may be provided on the other side 12 of the schoolbus 10 to prevent children, other people or objects from falling underneath the schoolbus 10 unbeknownst to the schoolbus driver. Further, a lighting strip 20 may be provided at the back side 13 of the schoolbus 10; and also at the front of the bus on the bumper looking down, to augment the headlights.

Figure 7A:
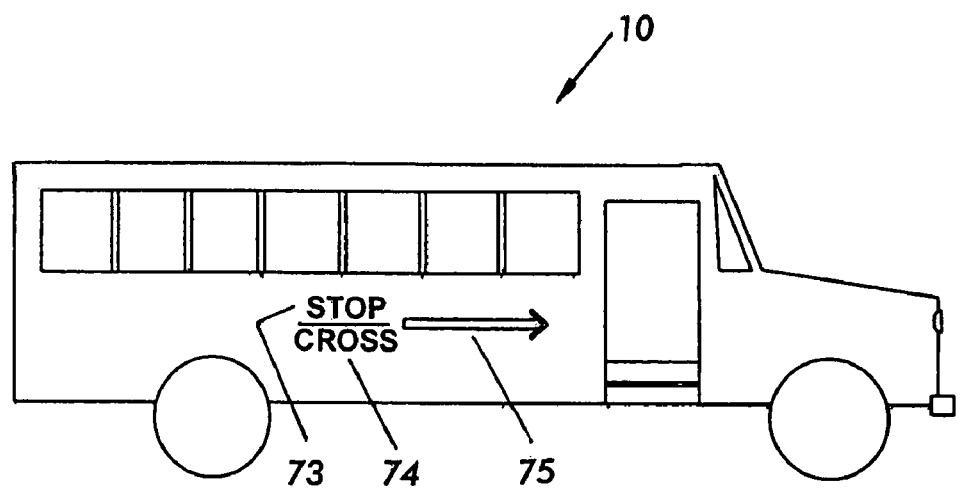
FIGS. 7A and 7B are side views illustrating lighting strips that provide arrows and words to guide children on the passenger side and the driver's side of the bus, respectively, according to an aspect of the present disclosure.
Figure 7B:
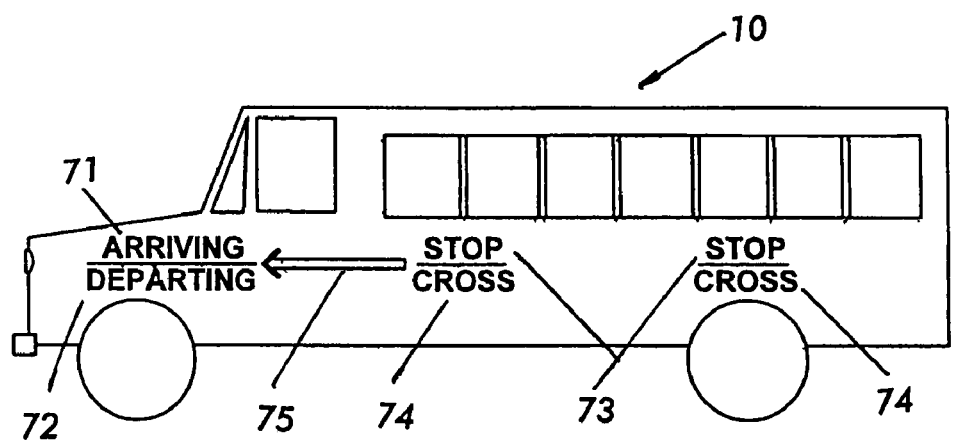

Also contemplated is a lighting strip 20 that is configured to signal words or arrows, as shown in FIGS. 7A and 7B. The lights of the lighting strip 20 may signal letters or a word such as "arriving" 71 to indicate the arrival of the schoolbus and to warn children away, to leave the curb until the schoolbus 10 has stopped while the arriving sign 71 is displayed or is flashing. Similarly, lighting strip 20 using the same or a different set of lights may signal a word such as "departing" 72 to alert children and other passengers to move away from the bus and to get on or stay on the sidewalk. Signal words such as "stop" 73 and "cross" 74 to warn passengers to stay or move away or to guide them, respectively, as is deemed necessary by the driver, may also be included. As shown in FIGS. 7A and 7B, each of these signals may be provided on either the passenger side or the driver's side, or both. In addition, such signs may also be provided on the back or front side of the vehicle. Such signs may be provided by use of lights of different colors, for example, red lights may be configured to display the stop word 73 while green lights may be configured to display the word "cross" 74. The arrow 75 may be displayed by a use of lights of a similar or different color pointing toward the front end of the bus to guide the children to cross in front of but not behind the schoolbus 10. Also, the arrow 75 may be displayed in different colors, such as green to indicate that it is safe to leave the sidewalk and red to indicate that the schoolbus is about to depart and that crossing is no longer safe. Alternatively, a steady light may indicate that it is safe to cross or to leave the sidewalk while a flashing light may indicate that it is not safe to do so (or vice versa). Such lights, in addition to guiding the children and their guardians, may also serve to alert other drivers to the presence of children and to remind them of the requirement that they not enter the children's crossing area near the schoolbus. The lighting strip 20 may also be wired to automatically display the letters or arrows based on the opening or closing of the door, and the events and conditions described with respect to other embodiments described herein.

Further, a clearly audible sound or noise may also be provided to accompany the displayed signs. For example, the sound may be a human voice advising of the arrival or departure of the schoolbus 10 to accompany the words 71 and 72, respectively, and advising that it is safe to cross accompanying the cross signal 74 or that it is unsafe to cross or to leave the sidewalk to accompany the stop symbol 73. However, other types of sounds may be provided such as a loud buzzing noise to indicate that the bus is arriving, departing, or that it is unsafe to cross to accompany the corresponding signs, and a friendly chirping noise or music to accompany the signs indicating that it is safe to cross or to leave the sidewalk.

Figure 10A:
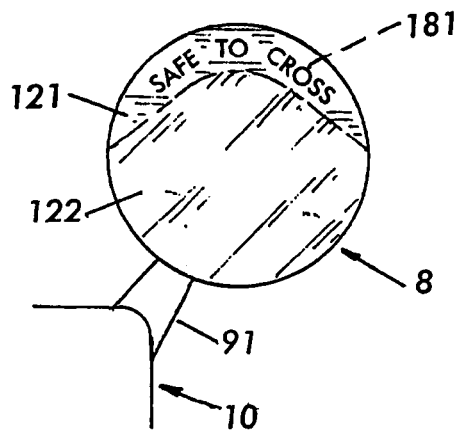
FIGS. 10A and 10B are perspective views of cross-view mirrors that include status and guiding information, according to an aspect of the present disclosure.
Figure 10B:
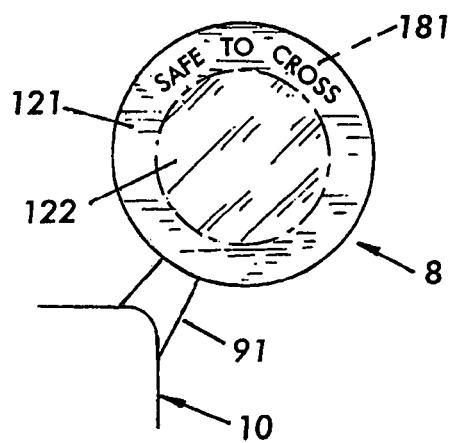

A mirror or a set of mirrors may further include the system for providing vehicle status information and guidance to passengers and pedestrians as shown in FIGS. 10A and 10B. One or more mirrors, such as a cross-view mirror 8 shown in FIGS. 10A and 10B, or an oval mirror positioned on a hood or other exterior portion of the vehicle, such as for example at a passenger's side or a driver's side at the front, or at a passenger's side or driver's side along the side or near the back of the vehicle, or a rear-view mirror positioned inside the driver's cabin, may include a lighting mechanism or a lighting strip or a light that provides the status information and guide information providing portion 181. Such a system may work alone or in concert with the lighting strip 20 positioned on the outside of the vehicle or with other lighting mechanisms or other lighting strips as described herein.

As shown in FIG. 10A, the mirror may include a top portion 121, a see-through glass portion, above the mirror face 122 of mirror 8. Mirror 8 is shown as the mirror attached to the front hood of the vehicle 10, but the status information and guiding information providing portion 181 may be attached to or formed as part of any of the other mirrors of the vehicle 10. Behind the top portion 121 may be positioned the status information or guide information providing portion 181. Such a status information or guide information providing portion 181 may comprise an LED, LCD, digital display means, or a series of lights, light strips, or light sources arranged to provide passengers in the vehicle or pedestrians outside the vehicle with information about the status of the vehicle or guiding information, about, for example, whether it is safe to cross. For example, as shown in FIG. 10A, the status information and guiding information providing portion 181 may clearly display or flash the letters "SAFE TO CROSS" to indicate that the vehicle has come to a full stop, the schoolbus lights are flashing and it is safe to board or disembark from the vehicle 10. Such a system may work in conjunction with the lighting strip 20 provided on the side of the vehicle to illuminate the area adjacent to or near the vehicle 10.

FIG. 10B shows an embodiment in which the status information and guiding information providing portion 181 is formed under a transparent glass portion 121 around the circumference of the mirror face 122 of the mirror 8. However, the status information and guiding information providing portion 181 may also be provided on or as an integral part of the frame of mirror 8. As explained in connection with the other signs that are provided, the status information and guiding information providing portion 181 provided on mirror 8 may also provide other types of visual or audio, or a combination of visual and audio information such as "DO NOT CROSS," "CHILDREN CROSSING," "STOP," "STOP REQUESTED," "ARRIVING AT STOP," "NOW DEPARTING," "NEXT STOP IN 10 SECONDS," "DOORS CLOSING," "DOORS OPENING," "STAND BACK," "STAND AWAY FROM THE BUS," or the like. The status information and guiding information providing portion 181 may also include a countdown timer indicating when the vehicle 10 will depart or when the vehicle's doors will close, or indicating when the vehicle 10 will come to a stop, at which point it is safe to move about or to disembark from or board the vehicle 10. Such a countdown timer may be provided in addition to, or instead of, one or more of the foregoing signs and may be provided in the form of seconds being decreased or increased shown on the status information and guiding information providing portion 181, or as one or more colored lights such as, for purposes of illustration, green to indicate ample time left, yellow to indicate little time left, and red to indicate stop or no time left. It will be understood that many such combinations are possible, for example a steady light may indicate ample time left and a flashing light may indicate little time left or the like. Further, in addition to the status information and guiding information providing portion 181 being provided as shown in FIGS. 10A and 10B, it may also be provided on the arm 91 of the mirror or at the base of the arm 91 of the mirror 8 (where the arm attaches to the stationary portion of the vehicle 10).

Similarly, each of these signs may be accompanied by audio information, such as a human voice enunciating these words, or a noise or a sound to guide passengers and pedestrians about each of these signs. Also, signs in more than one language or more than one writing system may be provided. In addition, instead of writing, lights or different colored lights may be provided, such as a red light for "STOP" or "MOVE AWAY FROM THE BUS," versus a green light for "SAFE TO CROSS" or the like. Thus, what is contemplated is a system in which such signs on mirrors alone, or on vehicle side lighting strips 20, or on a combination of the foregoing are provided to educate pedestrians around the vehicle, passengers on the vehicle including children, and other vehicle drivers about the status of the vehicle. Thus, an aspect of a system according to the present disclosure is to promote pedestrian and passenger awareness and safety education, in addition to promoting safety.

Also contemplated is an embodiment in which different colored lights are used to indicate various types of information. For example, red lettering may show messages that prohibit certain activities, such as the message "DO NOT CROSS," while green lettering may be used for messages such as "OKAY TO CROSS" or other allowed activities. In addition, one color lettering may be used to display messages about vehicle operation and safety, such as messages about crossing and boarding, while another color lettering may be used to show messages about less grave matters, such as the countdown timer indicating arrival and departure, which may be provided as an educational tool or as a tool to expedite boarding and disembarking. Alternatively, red lettering may be used to show messages such as "DON'T WALK," or "STAND AWAY FROM THE VEHICLE," whereas green lettering may be used to show the countdown timer indicating when the doors will next be opened.

Figure 4:
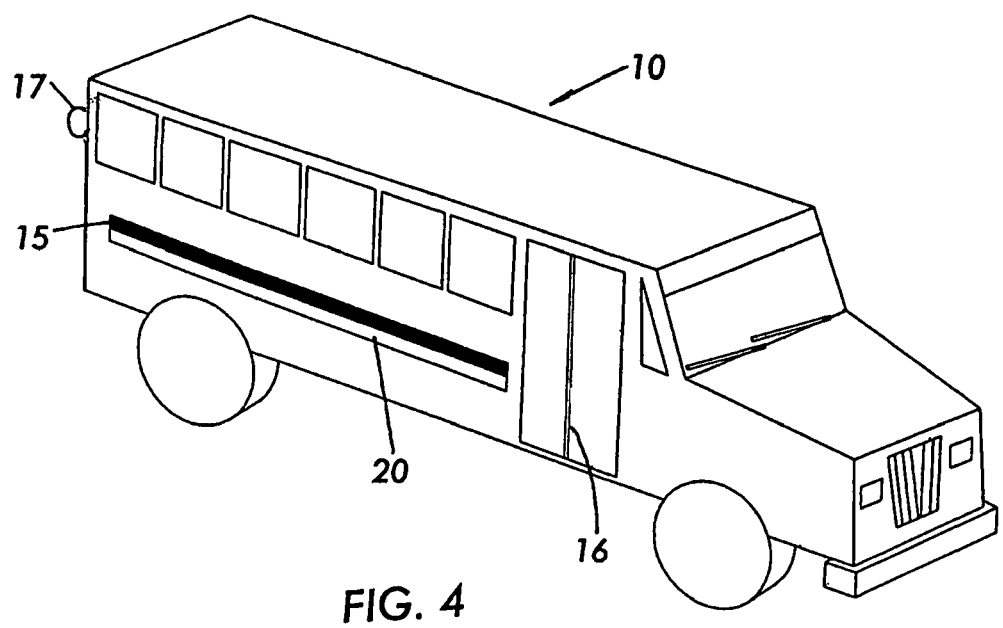
FIG. 4 is a perspective view of a schoolbus showing a lighting strip mounted on a side of the schoolbus under a side bumper, according to an embodiment of the present invention.

FIG. 4 shows lighting strip 20 mounted underneath bumper 15 of schoolbus 10. When schoolbus 10 is provided with bumper 15, mounting lighting strip 20 immediately underneath bumper 15 has the advantage of protecting lighting strip 20 from impact, precipitation or the like, and the effect of further preventing the diffusion of light upwards where it is unneeded and may interfere with visibility through the schoolbus mirrors.

Figure 6:
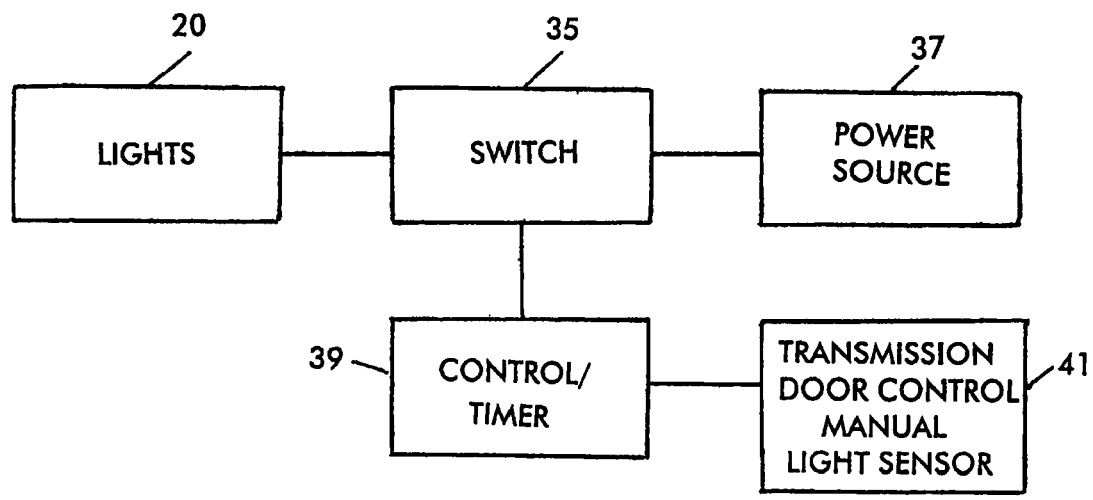
FIG. 6 is a block diagram of a controller for the light system of the present disclosure.

Also provided is a control illustrated in FIG. 6 for the lighting strip 20. The lighting strip 20 may be switched on automatically via switch 35 which interfaces with a power source 37, with the opening of the door 16, such as by the turning on of the light in the stairwell of the door of the schoolbus 10 by operation of the door control (not shown). Further, the lighting strip 20 may be turned on when the flashing light 17, provided, for example, at the rear side 13 of the schoolbus 10 or on other surfaces, is turned on. Alternatively, the schoolbus driver may separately turn on or off the lighting strip 20. As another alternative, the control 39 may respond to the vehicle's transmission state, e.g., park, drive, etc., as illustrated by control source 41.

The lighting strip 20 may be turned off manually or using a control/timer 39 that is started after the door 16 is closed or the flashing light 17 is turned off. For example, the lighting strip 20 may be turned off approximately ten seconds, thirty seconds or two minutes after the door 16 is closed or the flashing light 17 is closed, or at some predetermined time. Alternatively, the lighting strip 20 may be turned off contemporaneously with the closing of the door 16 or the turning off of the flashing light 17.

Figure 11:
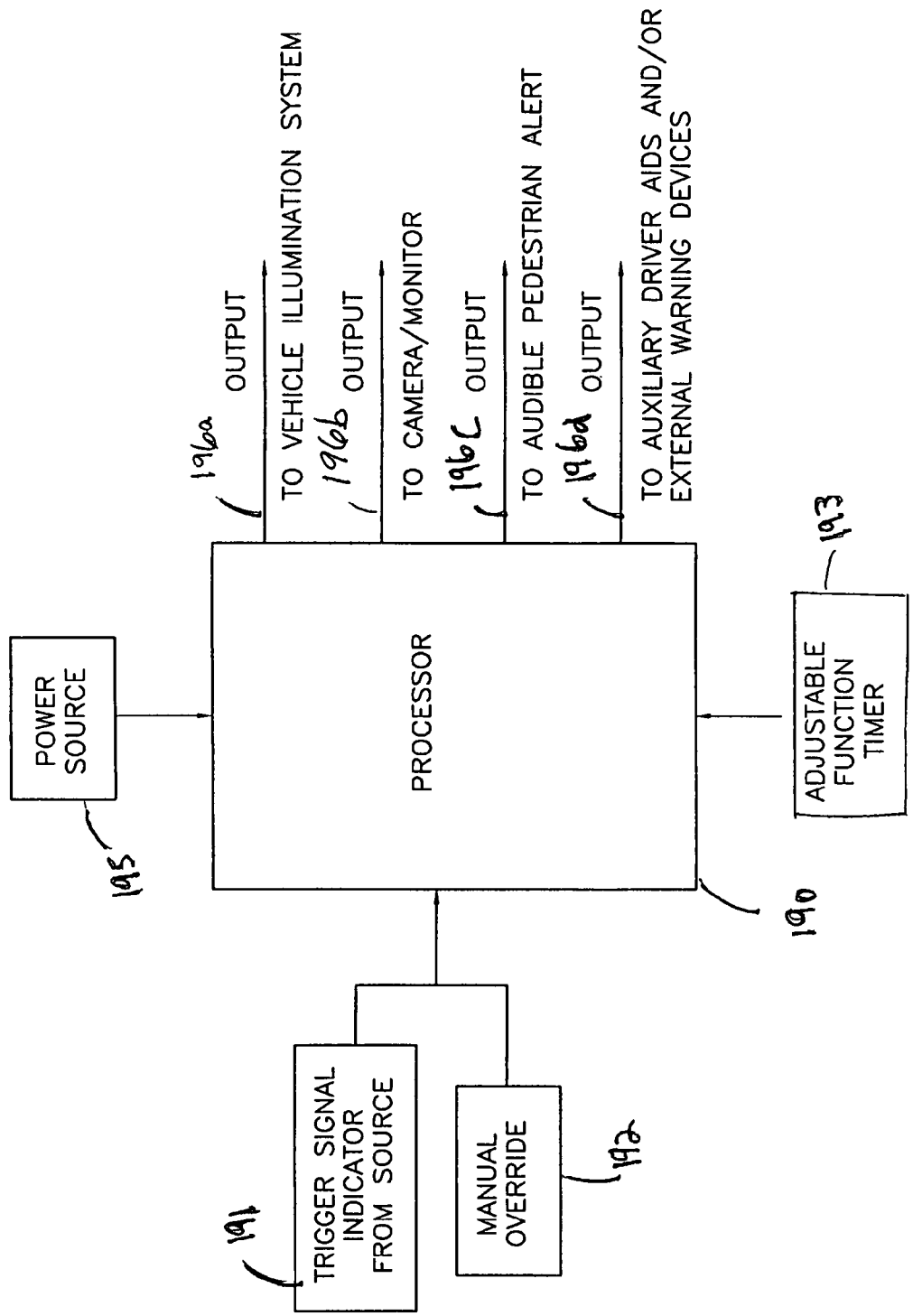
FIG. 11 is a schematic illustration of a control system for the lighting system according to an aspect of the present invention.

FIG. 11 is a schematic illustration of a control system for the external illumination system according to an aspect of the present invention. Processor 190 receives input from trigger signal indicator 191, such as, for example, the shifting of the schoolbus 10 from a park gear to a first gear (or vice versa), the opening or closing of a vehicle door, the turning on or off of one or more amber or red flashing schoolbus light to indicate boarding/disembarking, or the like. Processor 190 also receives input from manual override 192, which allows a driver to control the external lighting, audible alerts and external warning devices or the like, for example, by opening a vehicle door, or the like. A powersource 195 provides power to processor 190. Also, adjustable function timer 193, for example a processor clock, can be adjusted to provide timing signals for the processor 190 for controlling functions that require timing.

Processor 190 may provide integrated control over the camera, monitor, lighting, audible alert, countdown display and other external warning systems of the vehicle. Accordingly, processor 190 controls the ON/OFF state and operation of the vehicle lighting system, including lighting strips 20 and/or the floodlights 25, through output 196a, the ON/OFF state and operation of the external cameras (and internal camera) and monitor systems for viewing the fields of views of the cameras through output 196b, the ON/OFF state and operation of the audible pedestrian alert system, such as the audio alert system for passersby and passengers boarding or disembarking from the schoolbus 10 through output 196c, and the ON/OFF state and operation of auxiliary driver aids or other external devices, for example, the flashing amber or red schoolbus light, the crossing gate 80 or stop sign mounted from the exterior of the vehicle, or the like, through output 96d. Thus, as discussed, when the schoolbus door is opened, processor 190 receives a trigger signal from trigger signal indicator 191, and the processor 190 may then activate a passenger boarding mode, which could entail turning on the red or amber flashing schoolbus lights, the turning on of lighting strip 20, the start of countdown display, the deployment out of the crossing gate 80, the turning on of an audible sound to inform passengers or those waiting to board that it is safe to approach the schoolbus or to cross the street, the switching on or the selection among exterior cameras and the like. Similarly, the receipt of a signal indicating the closing of the door of the schoolbus 10 may cause the processor 190 to output a different set of instructions via outputs 196a-196d.

Although shown for illustration as separate individual outputs, outputs 196a-196d may be provided as a single signal bus, or may be provided as an output interface that communicates via a wired or wireless connection with the systems that control the above-discussed systems controlled by processor 190. Also, these controlled systems may provide feedback signals or messages to processor 190, to indicate a receipt/non-receipt of a signal, message or command, a failure or malfunction of the controlled system, a light sensor reading or other external condition, or the like.

Figure 5:
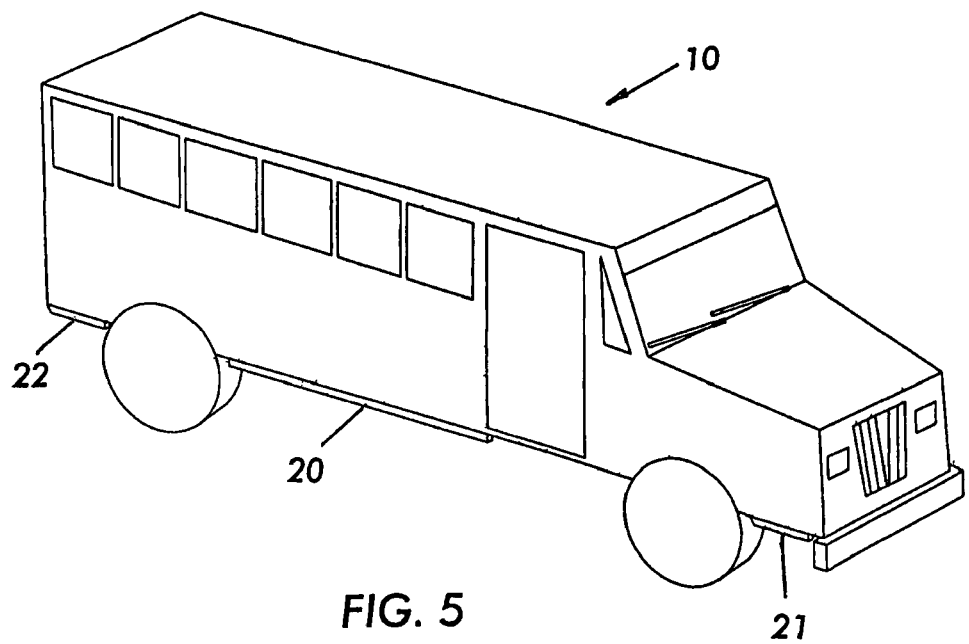
FIG. 5 is a perspective view of a schoolbus showing lighting strips mounted on an underside of the schoolbus along one side of the schoolbus, according to an embodiment of the present invention.

FIG. 5 shows a lighting strip 20 provided on the underside of the schoolbus 10. An additional lighting strip 21 also provided on the bottom of the schoolbus 10 near the front end. Further additional lighting strip 22 arranged on the bottom of the schoolbus 10 near the back may also be provided. It will be understood that similar lighting strips may be provided on the other side 12 and/or at the back side 13 of the schoolbus 10. Further, two such lighting strips may be provided, one along the side 11 as shown in FIG. 3 and one along the underside of the schoolbus 10 as shown in FIG. 5.

Providing the lighting strip 20 on the underside of the schoolbus 10 focuses the illumination to where it is needed most and reduces the diffusion of light which may interfere with the visibility through the schoolbus mirrors, and locates the strip 20 at a location which protects it against damage.

Figure 1:
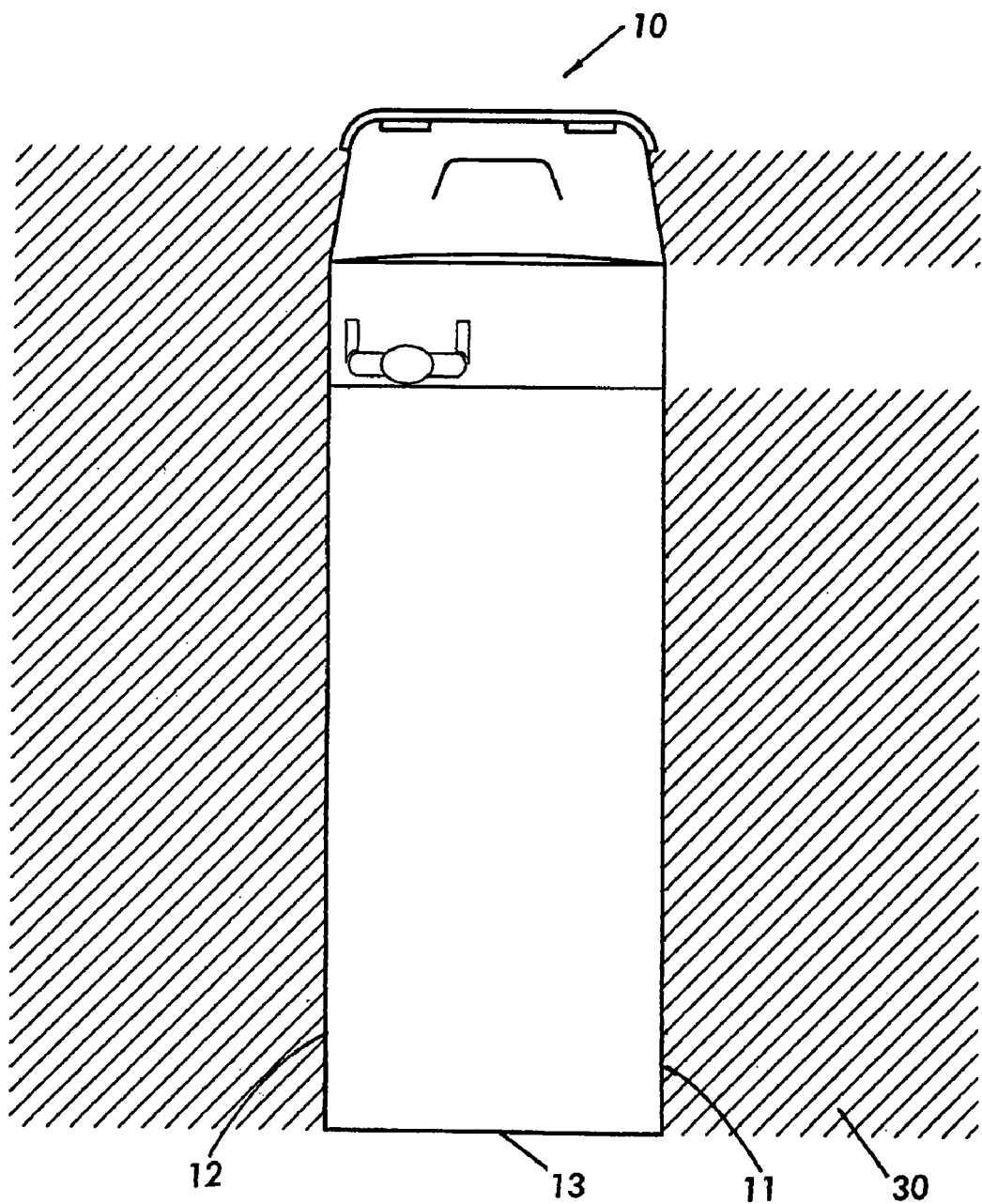
FIG. 1 is a schematic diagram illustrating a top view of a schoolbus with illuminated areas provided by lighting strips mounted on both sides of the schoolbus, according to an embodiment of the present invention.
Figure 2:
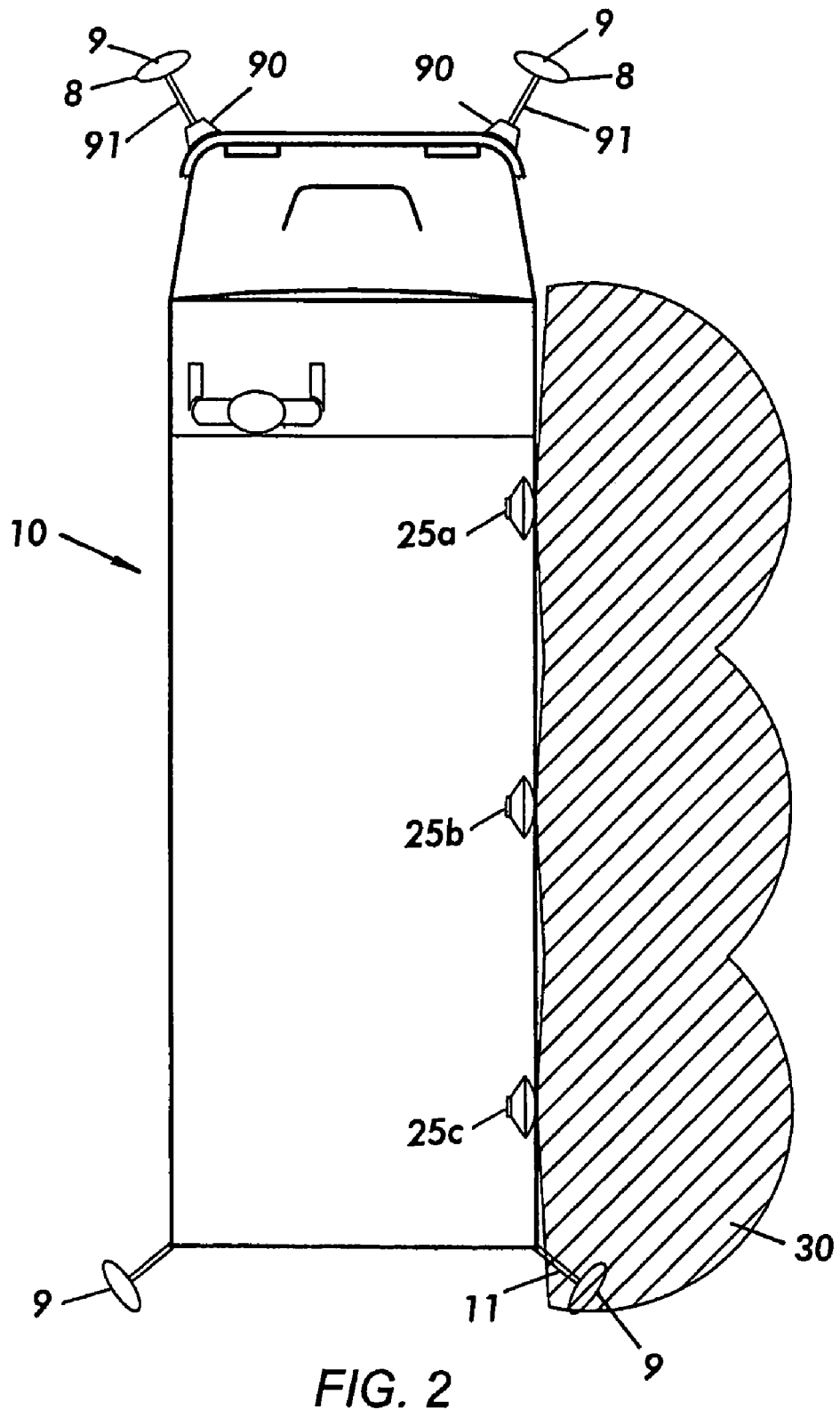
FIG. 2 is a schematic diagram illustrating a top view of a schoolbus with floodlights mounted on or near the top of the schoolbus along one side, according to an embodiment of the present invention.

FIG. 2 shows another embodiment in which floodlights 25a, 25b and 25c are provided at or near the top of the schoolbus 10. The floodlights 25a-25c are focused down to illuminate the pavement or the space just above the pavement along the side 11 of the schoolbus 10. Although three floodlights are shown in FIG. 2, it will be understood that fewer or more floodlights may be provided as necessary to illuminate the area. The floodlights may be provided as halogen lamps, strobe lights, incandescent bulbs, neon lights, LEDs, other type of lighting sufficient to provide the illumination necessary, preferably without blinding the driver of the vehicle 10 or of adjacent vehicles.

According to an aspect of applicant's invention, the floodlights 25a-25c may be mounted on the arms located at the four corners of the bus, on which cameras 9 are mounted. These cameras 9 are used by the schoolbus driver to observe the area surrounding the schoolbus 10, including the illuminated areas 30, to prevent accidents as shown in provisional patent application Ser. No. 60/857,250, the contents of which are incorporated by reference herein. The cameras may be mounted on the same arms 91 as the mirror 8 or on different arms. Motion detectors may be mounted on or adjacent the cameras 9, and these cameras may provide a signal to a display inside the bus, which signals are recorded when the school bus takes on or discharges students.

According to an aspect of this embodiment, one or more of the floodlights may automatically sweep the area on a frequent basis, or may be directed at the discretion of the schoolbus driver. Alternatively, one of the floodlights, such as the center floodlight 25b, may sweep the area back and forth or may be controlled and directed by the schoolbus driver with the other floodlights 25a and 25c remaining fixedly focused. It will be understood that, as with the lighting strips, the floodlights 25a-25c may be provided also on the other side 12 of the schoolbus 10 and may be controlled to turn on and off in a manner similar to the lighting strip embodiment. Further, a combination of floodlights and lighting strips 20-22 may be used on the same schoolbus 10 mounted at different places on the schoolbus 10. Thus, for example, floodlight 25b may be provided as a source of illumination steerable or directable by the schoolbus driver with lighting strips 20-22 provided along the side or on the bottom of the schoolbus 10. While the lighting strips 20-22 may be comprised of LED light sources, other types of lights may also be used in addition to or instead of LEDs, such as halogen lamps, incandescent bulbs, strobe lighting, neon lights or other types of illumination sufficient to accomplish the aims of the invention.

Figure 8A:
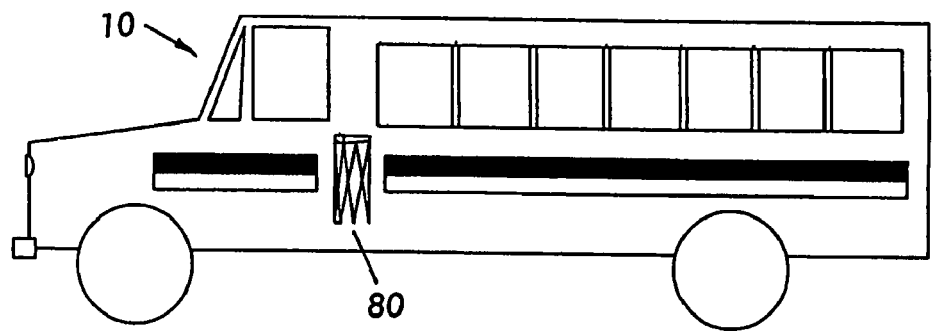
FIGS. 8A-8D illustrate a telescoping crossing gate attached to a side of the schoolbus according to an aspect of the present disclosure.
Figure 8B:
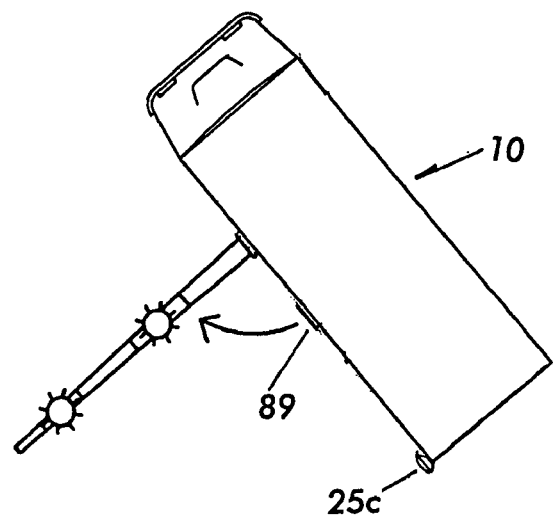
Figure 8C:
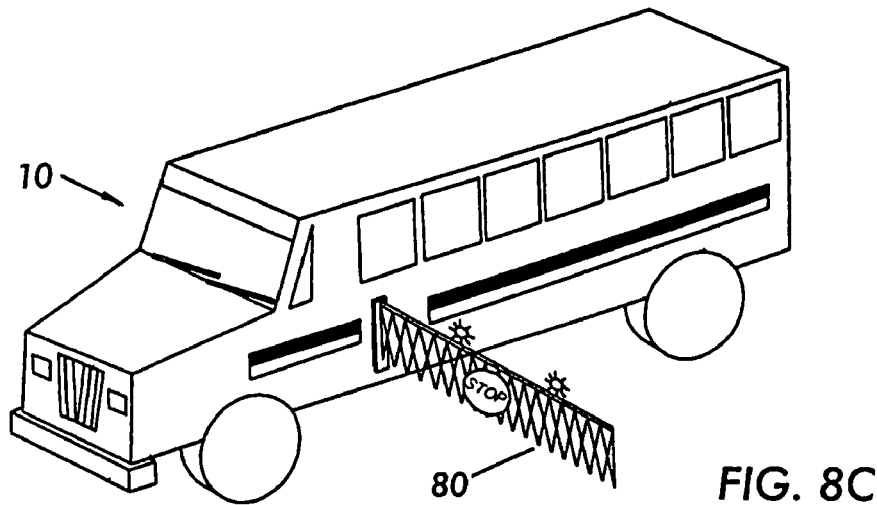

Also, as shown in FIGS. 9A and 9B, the floodlights or other types of lighting structures 25a and 25b may be provided on a mirror arm 91 or a mirror mount 90 (FIG. 2) that extends from a side of the vehicle. Many schoolbuses have mirrors mounted on ends of mirror arms that extend up and out from a side of the schoolbus. Such mirror arms and mounts can provide ideal positions for placement of the floodlights 25a and 25b because they are positioned above the zone that needs to be lit. Accordingly, a floodlight 25a may be positioned on a mirror arm positioned near the front of the vehicle and, if necessary, a second floodlight 25b may additionally be positioned on a mirror arm that is positioned near a back end of the vehicle. It will be understood that these floodlights 25a and 25b will be oriented such that the light is aimed and focused down toward the pavement to alert the driver about the presence of children without interfering with the visibility provided by the mirrors or visibility of the driver in general. Additional floodlights 25c may be positioned on the driver's side mirror arms or mirror mounts of the schoolbus as shown in FIG. 8B.

In addition, the signal processing system may provide an audible indication to a schoolbus driver, for example, a buzzing sound as long as the lighting strips 20-22 or floodlights 25a-25b is turned on.

In addition, the strip 20 may be removably mounted in sliding channels mounted to the bus, so that the lighting strips may be easily replaced for service, repair and other purposes.

The lighting system, including the lighting strips 20-22 and the floodlights 251-25b may be activated or deactivated automatically when movement is detected near the schoolbus 10. For example, LADAR (laser radar), infrared laser, or other detection systems may detect the presence or the movement of children or other passersby in an area near, adjacent or under the schoolbus 10, and the lighting system, or a relevant portion thereof, may thereby be automatically be triggered via processor 190. In addition, or in the alternative, a light meter or other sensor for detecting an amount of light or visibility condition may be provided at the schoolbus to trigger the lighting system when the visibility falls below a minimum acceptable range.

Children or other passengers crossing the street to board or to disembark from the schoolbus present particular difficulties, owing to on coming vehicles or drivers who carelessly attempt to pass the stopped school bus from the rear and to the left of the school bus. To guard against such possibility, a pike or crossing gate 80 may be provided on the exterior of the schoolbus 10 on the side of the driver. FIG. 8A shows the telescoping crossing gate 80 in a contracted position that in addition is folded into or against the side of the schoolbus 10. Accordingly, the crossing gate 80 is provided so that when the schoolbus stops to allow children to board or to disembark, the crossing gate 80 may be deployed to an extended position as shown in FIG. 8B. Accordingly, vehicles behind the schoolbus would be provided an additional warning and a barrier and deterred from passing the schoolbus 10 during such times. Correspondingly, vehicles in oncoming traffic to the schoolbus would be additionally warned to stop by and away from the crossing gate 80. Moreover, children and guardians of children would learn that it is safe to cross the road only when they see the crossing gate 80 in the expanded deployed position as shown in FIG. 8B.

Figure 8D:
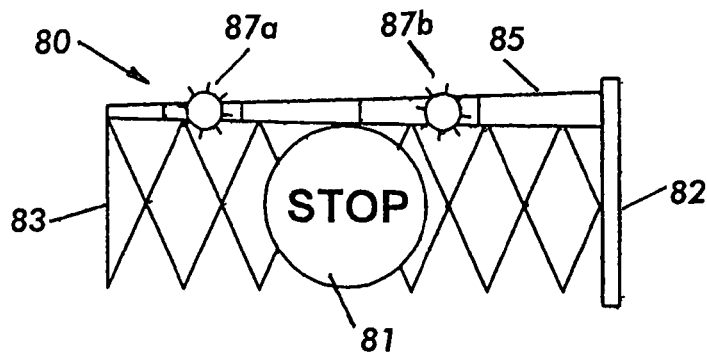

As shown in FIG. 8D, a stop sign 81 may be also provided on the back of or on the front (not shown) of the crossing gate 80 or on both the front and the back to further warn oncoming traffic of the likely presence of children. It will be appreciated that, while stop sign 81 is shown as circular, the more conventional octagonal-shaped stop sign or electronic lights such as one or more red lights or an electronic display spelling out a message such as "stop" or the like in English and/or in other languages may be provided in addition to or instead of the conventional stop sign 81. One or more flashing or steady lights 87a-87b, emitting white light or colored lights may also be positioned on the crossing gate 80 and may be activated when the crossing gate 80 is deployed to highlight the stop sign 81 to warn motorists.

As shown in FIG. 8D, the crossing gate 80 consists of a mesh of crisscrossing bars 83 which allow the expansion and contraction of the crossing gate 80. In addition, a hinge unit 82, shown in FIG. 8D, is provided to secure the crossing gate 80 to the side of the schoolbus 10. Further, the crossing gate 80 may be made to expand and to contract by the driver by electronic signaling provided at the driver's station. For example, a telescoping bar 85 with a hydraulic activator may be provided to expand the crossing gate 80 when the schoolbus 10 is stopped and then to contract it when the boarding and disembarking of the passengers is complete. The mesh of crisscrossing bars may be covered with an expanding soft material to protect it against the elements or to improve its appearance.

Similarly, the hinge 82 may pivot in the crossing gate 80 to align the crossing gate 80 very close to or in immediate contact with (flush with) the exterior of the driver's side of the schoolbus 10 by electronic means. For example, the unfolding of the crossing gate 80 to a near 90 degree position with respect to the outer surface of the exterior of the driver's side of the schoolbus 10 and the expansion of the crossing gate 80 by the telescoping out of the hydraulic bar 85 can be initiated by the driver's pressing of a single button when the driver deems it safe to cross the road. Alternatively, the crossing gate may be deployed by unfolding and expanding automatically after the doors of the schoolbus are opened, or when the lighting strip 20 is activated. Also, a distal end of the crossing gate 80 may be snap into a corresponding receiving tongue 89, or a set of more than one such tongues, positioned on the exterior of the side of the schoolbus 10 to secure the crossing gate 80 while the schoolbus 10 is in motion.

The crossing gate 80 may be provided at a level low enough to physically block or come close to physically blocking the passage of passenger vehicles in the lane(s) adjacent to the driver's side of the schoolbus 10. Alternatively, the crossing gate may be positioned at a greater height to be clearly visible in the line of sight of taller vehicles. The crossing gate 80 may extend far enough out to block substantially all or most of the lane(s) adjacent to the schoolbus 10 on the driver's side. However, it will be appreciated that it may be sufficient to have the crossing gate 80 expand enough to block about a third, a half, or two-thirds of that lane. Also, while the stop sign 81 is shown as being positioned near the middle of the crossing gate 80 when in the expanded position, the stop sign 81 may be positioned off center, and in addition may be positioned to hang below the crossing gate 80. If positioned below the crossing gate 80, the stop sign 81 would provide a larger visible area to warn off vehicles against passing the children's zone. It will be recognized that the crossing gate 80 may be painted bright colors, such as red, yellow or safety orange, or a combination of such colors to maximize the effectiveness of the warning. In addition, a sound alert may also be provided while the crossing gate 80 is in the expanded open position and during the expansion and contraction of the crossing gate 80. For example, a buzzing sound or a sound emulating a human voice cautioning vehicles to stop or alerting vehicles about the presence of children, or a voice signaling to children that it is safe to cross the street may be provided.

Although the present disclosure has been described in relation to particular embodiments thereof, many other variations, modifications, combination of features, and other uses will become apparent to those skilled in the art. It is preferred, therefore, that the present disclosure be limited not by the specific disclosure herein, but only by the appended claims.

What is claimed is:

1. A ground illumination system for a vehicle having passenger and driver side exterior walls and a rear vehicle wall, the ground illumination system comprising:
   a motion detection system mounted to a portion of the vehicle used to detect external movement and outputting a signal;
   a control system, receiving the signal from said motion detection system and transmitting an activation signal;
   a light structure which directs light primarily at ground level and along an area strip located adjacent the passenger side wall of the vehicle, enabling a driver to view a passenger located in the area strip via an exteriorly mounted bus mirror or camera, under conditions of low visibility, said light structure being activated automatically responsive to the activation signal transmitted by said control system when movement is detected by said motion detection system in an exterior area at least one of near, adjacent and under the vehicle;

and wherein the light structure is operable to illuminate the area strip and to display a visual alert including at least one of an arrival of the vehicle, a departure of the vehicle, and safe to cross in front of the vehicle responsive to the activation signal received from said control system, and wherein the vehicle is a bus, the area strip located adjacent the passenger side wall of the vehicle is substantially rectangular and extends substantially along the passenger side wall, and the light structure comprises an elongated LED strip, extending along the passenger side wall.

2. The ground illumination system of claim 1, wherein the vehicle comprises a bumper extending along the passenger side wall and wherein the light structure is mounted to extend along and under the bumper.

3. The ground illumination system of claim 1, wherein the light structure is mounted substantially at an underside of the vehicle.

4. The ground illumination system of claim 1, wherein a controller of the vehicle includes an interface which receives an input signal from one or more of a transmission, a manual switch, and a passenger door control.

5. The ground illumination system of claim 1, wherein the light structure is positioned above windows of the vehicle, in an orientation where the light from the light structure is directed toward the ground.

6. The ground illumination system of claim 1, wherein the light structure includes components that are located both at the passenger side and the driver's side exterior walls.

7. The ground illumination system of claim 1, wherein the light structure includes components that are located both at the passenger side and the rear side walls.

8. The ground illumination system of claim 1, including a control and an associated timer which control the light structure in response to an event comprising at least one of closing or opening a passenger door of the vehicle, issuance of a manual command to turn on or turn off the light structure, commencement or cessation of flashing of an amber or a red light positioned at an exterior of the vehicle, and a shifting of the vehicle's transmission into a drive mode.

9. The ground illumination system of claim 8, including automatically turning off the light structure by the control and associated timer after the lapse of a set time period after occurrence of the event, wherein the light structure remains off until the occurrence of another of said event.

10. The ground illumination system of claim 9, wherein the set time period is adjustable.

11. The ground illumination system of claim 1, wherein the light structure comprises at least one light which is capable of providing a sweeping light beam that illuminates the area strip.

12. The ground illumination system of claim 11, wherein the at least one light providing a sweeping light beam is programmable to automatically sweep back and forth along a length of the area strip.

13. The ground illumination system of claim 11, wherein the at least one light providing a sweeping light beam is manually controllable to be directed to a location along a length of the area strip at the discretion of a driver of said vehicle.

14. The ground illumination system of claim 1, including cameras mounted to the vehicle, an image recording system for the cameras, and a control which causes images of at least one of the cameras to be recorded on the image recording system during passenger pick ups or discharges.

15. The ground illumination system of claim 1, wherein the light structure is positioned on a mount or on an arm of a mirror, the arm of the mirror extending away from the passenger side exterior wall or the driver side exterior wall.

16. The ground illumination system of claim 1, wherein the light structure is configured to display a signal indicating that crossing is safe or a signal indicating that crossing is unsafe.

17. The ground illumination system of claim 1, wherein the visual alert comprises one or more letters.

18. The ground illumination system of claim 17, wherein the one or more letters indicate at least one of arriving, departing, stop, and cross.

19. The ground illumination system of claim 1, wherein the visual alert comprises one or more arrows.

20. The ground illumination system of claim 1, wherein the light structure is operable to display the visual alert in response to at least one of an opening and a closing of a door of the vehicle.

21. The ground illumination system of claim 1, wherein the visual alert displayed by the light structure is of a different color than the light directed primarily at ground level and along an area strip located adjacent the passenger side wall of the vehicle.

22. The ground illumination system of claim 1, wherein the light structure further directs light at ground level and along an area strip located adjacent the driver side wall of the vehicle, and wherein the light structure is operable to display a driver side visual alert indicating at least one of an arrival of the vehicle, a departure of the vehicle, and safe to cross in front of the vehicle.

23. The ground illumination system of claim 1, further comprising a sensor for detecting at least one of an amount of light and a visibility condition, and wherein the sensor triggers the lighting system when visibility falls below a minimum acceptable range.

24. The ground illumination system of claim 1, wherein the motion detection system is mounted to an exterior portion of the vehicle.

25. A ground illumination system for a vehicle having passenger and driver side exterior walls and a rear vehicle wall, the ground illumination system comprising:

a motion detection system mounted to a portion of the vehicle used to detect external movement and outputting a signal;

a light structure which directs light primarily at ground level and along an area strip located adjacent the passenger side wall of the vehicle, enabling a driver to view a passenger located in the area strip via at least one of an exteriorly mounted bus mirror and camera, under conditions of low visibility, said light structure being activated automatically when movement is detected by said motion detection system in an exterior area at least one of near, adjacent and under the vehicle;

a control system, receiving the signal from said motion detection system and transmitting an activation signal to said light structure;

and wherein the light structure is operable to illuminate the area strip responsive to the activation signal received from said control system, and wherein the vehicle is a bus, the area strip located adjacent the passenger side wall of the vehicle is substantially rectangular and extends substantially along the passenger side wall, and the light structure comprises an elongated LED strip, extending along the passenger side wall.

* * * * *